United States Patent Office 3,517,033
Patented June 23, 1970

3,517,033
PROCESS FOR THE PRODUCTION OF ε-CAPROLACTONE AND ITS ALKYL DERIVATIVES
Otto Weiberg, Neu Isenburg, Germany, assignor to Deutsche Gold- und Silber-Scheideanstalt vormals Roessler, Frankfurt am Main, Germany
No Drawing. Filed Sept. 7, 1966, Ser. No. 577,584
Claims priority, application Germany, Sept. 25, 1965, D 48,296
Int. Cl. C07d 9/00
U.S. Cl. 260—343
8 Claims

ABSTRACT OF THE DISCLOSURE

ε-Caprolactone and lower alkyl substituted ε-caprolactones are prepared by reacting the corresponding cyclohexanone with an aliphatic percarboxylic acid of 2–4 carbons using water as the solvent. The process results in good yields and less by-product formation than when organic solvents are employed.

The present invention relates to an improved process for the production of ε-caprolactone and its alkyl derivatives by oxidation of the corresponding cyclohexanones with aliphatic percarboxylic acids containing 2–4 carbon atoms.

It is known that ε-caprolactone and its alkyl derivatives can be prepared by oxidation of the corresponding cyclohexanones with peracids in organic solvents. Among such processes the use of water free peracetic acid or acetaldehyde-monoperacetate in inert organic solvents has been described. The latter process, as a prerequisite, requires the production of peracetic acid or acetaldehyde-monoperacetate from acetaldehyde with the aid of molecular oxygen. This process is not only costly but also technically difficult to carry out and yields peracetic acid in organic solvents and therefore mixtures which, because of their inflammability and explosiveness, are difficult to handle. Because of these dangers it also seems advisable to employ concentrations of peracetic acid in, for example, acetone or ethyl acetate, which are not higher than 25%. A further disadvantage of the use of peracetic acid in organic solvents, which is produced by the process described above, resides in that a market must be provided for the acetic acid produced as a by-product during the conversion of the cyclohexanone into ε-caprolactone. Such process therefore presents a process for the joint production of ε-caprolactone and acetic acid.

According to the invention it was unexpectedly found that ε-caprolactone and its alkyl derivatives could be prepared in good yields by oxidation of the corresponding cyclohexanone using aqueous solutions of aliphatic percarboxylic acids of 2–4 carbon atoms rather than organic water free solutions. That such a process would provide good yields of the lactone and that no noteworthy quantities of by-products are produced is surprising in view of a knowledge of the state of the art, as, it is, for example, known that a complete cleavage of the lactone ring of ε-lactones with formation of hydroxy carboxylic acids can be effected with water (see Houben-Weyl, Methods of Organic Chemistry, vol. 6/2, p. 780). In view of the behavior of ε-caprolactone in water containing reaction mixtures it was necessarily a conclusion that it is necessary that the presence of water be painstakingly avoided during the conversion of cyclohexanone to caprolactone with the aid of percarboxylic acids. In addition to the probability of the formation of its polyesters also had to be reckoned with. (See Houben-Weyl, Methods of Organic Chemistry, vol. 6/2, p. 708, wherein it is stated that in the oxidation of cyclic ketones with peracetic acid, the formation of polymers and by-products could be avoided to a far reaching degree by the absence of inorganic impurities, water, mineral acids or salts.) It was therefore not to be expected that ε-caprolactone could be produced from cyclohexanone in high yields with the aid of aqueous solutions of percarboxylic acids with substantial avoidance of the formation of by-products.

The percarboxylic acids employed according to the invention are in the form of their 20–75%, preferably 50–60%, by weight (wt. percent) aqueous solutions. The use of an about 60 wt. percent aqueous solution of peracetic acid has proved especially advantageous. Such aqueous solution, for example, can be obtained according to the process of German published application 1,165,576 from hydrogen peroxide and acetic acid with the aid of an acid catalyst.

The process according to the invention in addition to being applicable to cyclohexanone can also be applied to its alkyl derivatives in which the alkyl groups contain 1–4 carbon atoms and in particular its methyl derivatives. The cyclohexanone may be substituted one or more times by such alkyl groups.

The process according to the invention can be carried out batch-wise or continuously. In carrying out the process the aqueous percarboxylic acid, preferably prepared according to German published applications 1,165,576 or 1,170,926, is run into the cyclohexanone which mixes homogeneously with the aqueous percarboxylic acid of the concentrations indicated. The reaction is carried out at temperatures between room temperature and 100° C., preferably between about 40 and about 80° C. As the reaction is exothermic it is advisable that more or less cooling is provided depending upon the quantity being reacted. The reaction velocity is relatively high so that in general only about 15 to 60 minutes are required for substantial completion of the reaction. In order to prevent the production of undesired peroxide which may prove a danger in the processing of the reaction mixture, it is preferable to use an excess of cyclohexanone over the theoretical. The processing of the reaction mixture is simple as it can be easily separated by rectification, preferably under vacuum in a distillation column. In order to assist in the separation of the water which was introduced with the percarboxylic acid, it is advantageous to employ a larger excess of cyclohexanone which facilitates the separation of the water by distillation. The caprolactone is obtained in pure form as the highest boiling component.

The process according to the invention, for example, when using aqueous peracetic acid offers the following advantages over the previous processes using solutions of peracetic acid in an organic solvent.

(1) The safe handling of the aqueous peracetic acid.

(2) The possibility of operating with higher peracetic acid concentrations, for example, 60 wt. percent instead of 25 wt. percent which renders it possible to use smaller reaction spaces and also lowers investment costs.

(3) The acetic acid produced in the reaction can be recycled after reconversion to peracetic acid and therefore requires not other method of disposal.

The compounds per se are known and are for example intermediary compounds for the production of caprolactams.

The following examples will serve to illustrate the process according to the invention.

EXAMPLE 1

490 g. (5 mol) of cyclohexanone were placed in a three necked flask provided with a stirrer, thermometer and dropping funnel and then 315 g. (2.5 mol) of aqueous peracetic acid (60.4 wt. percent) were added thereto at 40° C. over a period of 30 minutes. The heat of reaction was removed by external cooling. After a further reaction period of 2 hours at 40° C., 95% of the active oxygen had reacted. The reaction mixture was then supplied to the middle of a column in which cyclohexanone was boiled under reflux at 35 torr. The excess cyclohexanone, water and acetic acid were withdrawn from the head of the column and the solution of caprolactone in cyclohexanone remaining in the sump of the column was rectified in a further column. After a forerunning of cyclohexanone 229 g. (80.4% of theory) of ε-caprolactone of a boiling point of 67–68° C. at 0.5 torr were recovered.

EXAMPLE 2

383 g. (3 mol) of aqueous peracetic acid (59.6 wt. percent) were added to 588 g. (6.0 mol) of cyclohexanone as described in Example 1. The reaction temperature employed was 70° C. After a total reaction period of 20 minutes 95% of the active oxygen was consumed. The processing of the reaction mixture was analogous to that of Example 1. The yield was 272 g. (79.5% of theory) of ε-caprolactone of a boiling point of 58–60° C. at 0.2 torr.

EXAMPLE 3

A mixture of 235 g. of cyclohexanone and 153 g. of aqueous peracetic acid (59.6 wt. percent) was passed per hour through a tubular reactor maintained at 70° C. The period the reaction mixture remained in the reactor was 10 minutes. The outlet of the reactor was connected to the mid-section of a column in which cyclohexanone was boiled under reflux at 35 torr. Cyclohexanone, water and acetic acid were continuously withdrawn from the head of the column and a solution of caprolactone in cyclohexanone continuously withdrawn from the sump. This solution was rectified in another column. During a 25 hour period of operation a total of 5880 g. of cyclohexanone and 3830 g. of the aqueous peracetic acid were supplied to the reactor. 3100 g. of ε-caprolactone (90.5% of theory) were obtained as reaction product. The mixture of cyclohexanone, water and acetic acid obtained as by-product was separated by distillation and the cyclohexanone recycled. The acetic acid recovered could be used for the production of further quantities of peracetic acid from acetic acid and hydrogen peroxide.

EXAMPLE 4

392 g. (4.0 mol) of cyclohexanone were reacted with 349 g. (2 mol) of aqueous perpropionic acid (51.6 wt. percent) in a manner analogous to that described in Example 1. The reaction temperature employed was 60° C. After a reaction period of 35 minutes 95% of the active oxygen was consumed. The processing of the reaction mixture was analogous to that of Example 1. The yield was 188 g. of ε-caprolactone (82.5% of theory).

The procedure was repeated using 367 g. (2 mol) of aqueous per-i-butyric acid (56.6 wt. percent) instead of the perpropionic acid. The yield was 194 g. of ε-caprolactone (85% of theory).

EXAMPLE 5

393 g. (3.5 mol) of the isomeric mixture of methyl cyclohexanones were reacted with 223 g. (1.75 mol) of aqueous peracetic acid (59.6 wt. percent) in a manner analogous to that of the preceding examples. The reaction mixture was introduced into the middle of a column in which an excess of ethyl benzene was boiled under a reflux at 40 torr. Water, acetic acid, methyl cyclohexanones and ethyl benzene were withdrawn from the head of the column. A solution of methyl caprolactones was withdrawn from the sump and distilled in a separate column. 186 g. (82.8% of theory) of a mixture of methyl caprolactone isomers of a boiling point of 66–73° C. at 0.5 torr were obtained.

340 g. (2.7 mol) of 3,4-dimethyl cyclohexanone were reacted analogously with 172 g. (1.35 mol) of aqueous peracetic acid (59.6 wt. percent) and the reaction mixture also processed analogously. 143 g. (74.8% of theory) of dimethyl caprolactones of a boiling point of 80–84° C. at 0.8 torr were obtained.

I claim:
1. In a process of producing a lactone selected from the group consisting of ε-caprolactone and lower alkyl substituted ε-caprolactones by reacting the corresponding cyclohexanone with an aliphatic percarboxylic acid selected from the group consisting of peracetic acid, perpropionic acid and perbutyric acid the improvement comprising carrying out such in the liquid phase with the aliphatic percarboxylic acid in a solvent consisting essentially of water.

2. The process of claim 1 in which the concentration of the aqueous percarboxylic acid is between 20 and 75% by weight.

3. The process of claim 1 in which the concentration of the aqueous percarboxylic acid is between 50 and 60% by weight.

4. The process of claim 1 in which the aqueous percarboxylic acid is aqueous peracetic acid of a concentration of about 60% by weight.

5. The process of claim 2 in which the reaction is carried out at a temperature between room temperature and 100° C.

6. The process of claim 2 in which the reaction is carried out at a temperature between 40 and 80° C.

7. The process of claim 1 in which said reaction is carried out in the presence of an excess of the cyclohexanone.

8. A process according to claim 1 carried out for a time of 15 to 60 minutes employing 2 moles of the cyclohexanone per mole of the aliphatic percarboxylic acid at a temperature between room temperature and 100° C. and in which the aliphatic percarboxylic acid is between 50 and 60% by weight of the total of water and said acid.

References Cited

UNITED STATES PATENTS 3,056,802   10/1962   Phillips et al. _____ 260—343
3,064,008   11/1962   Phillips et al. _____ 260—343

HENRY R. JILES, Primary Examiner
C. M. SHURKO, Assistant Examiner

U.S. Cl. X.R.
260—541